US010584803B2

(12) United States Patent
Toyama et al.

(10) Patent No.: US 10,584,803 B2
(45) Date of Patent: Mar. 10, 2020

(54) SOLENOID VALVE AND OIL PUMP

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Daisuke Toyama, Anjo (JP); Shinya Amano, Anjo (JP); Yoshikuni Sue, Anjo (JP); Hisashi Ono, Okazaki (JP); Shingo Okazawa, Toyota (JP); Michitaka Yamamoto, Okazaki (JP); Daisuke Okanishi, Toyota (JP); Noboru Takagi, Toyota (JP); Takayuki Hosogi, Toyota (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 309 days.

(21) Appl. No.: 15/611,318

(22) Filed: Jun. 1, 2017

(65) Prior Publication Data

US 2017/0350527 A1 Dec. 7, 2017

(30) Foreign Application Priority Data

Jun. 6, 2016 (JP) ................................. 2016-112846

(51) Int. Cl.
*F03C 2/00* (2006.01)
*F03C 4/00* (2006.01)
(Continued)

(52) U.S. Cl.
CPC ............ *F16K 31/0668* (2013.01); *F04C 2/10* (2013.01); *F04C 2/102* (2013.01); *F04C 14/18* (2013.01);
(Continued)

(58) Field of Classification Search
CPC .. F04C 2/10; F04C 2/102; F04C 14/18; F04C 14/226; F04C 15/064; F04C 2210/206;
(Continued)

(56) References Cited

U.S. PATENT DOCUMENTS 5,197,507 A * 3/1993 Miki ..................... F16K 27/048
137/625.65
5,797,732 A * 8/1998 Watanabe ............... F04C 14/24
417/310
(Continued)

FOREIGN PATENT DOCUMENTS

JP 55-166569 A 12/1980
JP 2000-205435 7/2000
(Continued)

OTHER PUBLICATIONS

JP2001304450A—Miyamoto et al.—Solenoid Valve and Its Control Method—Oct. 31, 2001—English Translation (Year: 2001).*
(Continued)

*Primary Examiner* — Theresa Trieu
(74) *Attorney, Agent, or Firm* — Oblon, McClelland, Maier & Neustadt, L.L.P.

(57) ABSTRACT

A solenoid valve includes: a cylindrical spool that has an annular groove in an outer surface and moves along an axial direction under a driving force generated by a current being applied to a solenoid part; a cylindrical sleeve that has a through-hole capable of communicating with the annular groove and houses the spool; and an urging member that urges the spool by an urging force acting in a direction opposite from a direction in which the driving force is generated. When no current is applied to the solenoid part, a part of the through-hole communicates with the annular groove. When a current is applied to the solenoid part, an area of communication between the through-hole and the
(Continued)

annular groove increases as the spool moves under the driving force acting against the urging force.

10 Claims, 7 Drawing Sheets

(51) Int. Cl.
| | |
|---|---|
| *F04C 2/00* | (2006.01) |
| *F16K 31/06* | (2006.01) |
| *F04C 14/22* | (2006.01) |
| *F16K 11/07* | (2006.01) |
| *F04C 2/10* | (2006.01) |
| *F16K 3/34* | (2006.01) |
| *F04C 14/18* | (2006.01) |
| *F04C 15/06* | (2006.01) |

(52) U.S. Cl.
CPC .......... *F04C 14/226* (2013.01); *F04C 15/064* (2013.01); *F16K 3/34* (2013.01); *F16K 11/0716* (2013.01); *F04C 2210/206* (2013.01)

(58) Field of Classification Search
CPC ............... F16K 27/048; F16K 31/0658; F16K 31/0668; F16K 11/0716; F16K 3/34
USPC ........................ 418/24, 30–31, 166, 171, 19; 251/129.15–129.17; 137/625.64, 625.65, 137/625.66
See application file for complete search history.

(56) References Cited

U.S. PATENT DOCUMENTS

| | | | | |
|---|---|---|---|---|
| 5,868,167 A | * | 2/1999 | Miki | .................... F16K 27/048 137/625.65 |
| 8,690,544 B2 | * | 4/2014 | Ono | ...................... F04C 14/226 418/30 |
| 2011/0014078 A1 | * | 1/2011 | Ono | ...................... F04C 14/226 418/30 |

FOREIGN PATENT DOCUMENTS

| | | |
|---|---|---|
| JP | 2001-304450 A | 10/2001 |
| JP | 2003-120845 | 4/2003 |
| JP | 2007-92714 | 4/2007 |
| JP | 2016-98767 A | 5/2016 |
| JP | 2016-125626 | 7/2016 |

OTHER PUBLICATIONS

Office Action dated May 29, 2018 in Japanese Patent Application No. 2016-112846 with partial English translation, 8 pages.

* cited by examiner

SOLENOID VALVE AND OIL PUMP

INCORPORATION BY REFERENCE

The disclosure of Japanese Patent Application No. 2016-112846 filed on Jun. 6, 2016 including the specification, drawings and abstract is incorporated herein by reference in its entirety.

BACKGROUND

1. Technical Field

The present disclosure relates to a solenoid valve and an oil pump to which this solenoid valve is connected.

2. Description of Related Art

There are known solenoid valves having a cylindrical spool that moves along an axial direction as a current is applied to a solenoid part, and a cylindrical sleeve that houses the spool (e.g., see Japanese Patent Application Publication No. 2000-205435 and Japanese Patent Application Publication No. 2007-92714).

In the solenoid valve described in JP 2000-205435 A, the spool has a first drain hole and a second drain hole that are staggered in the axial direction, and these drain holes can communicate with an annular groove formed in an inner surface of the sleeve. When a current is applied to the solenoid part and the spool moves, first, the first drain hole communicates with the annular groove, and then both the first drain hole and the second drain hole communicate with the annular groove. This allows a gentle change in the flow rate of a working fluid drained from the solenoid valve. The same literature also discloses an embodiment in which these drain holes have triangular shapes in a plan view so that areas of the drain holes communicating with the annular groove increase as the spool moves.

The solenoid valve described in JP 2007-92714 A includes a spool that has a groove in an outer surface and a sleeve that has a through-hole capable of communicating with this groove. The through-hole is provided at two positions in a circumferential direction, with the axial length of one through-hole larger than the axial length of the other through-hole. When a current is applied to the solenoid part and the spool moves, first, the one through-hole communicates with the groove, and then both through-holes communicate with the groove. This allows a gentle change in the flow rate of a working fluid discharged from the solenoid valve.

SUMMARY

In the solenoid valve described in JP 2000-205435 A, the plurality of drain holes are staggered in the axial direction, which adds to the axial length of the solenoid valve. Moreover, it takes machining time and effort to form the annular groove in the inner surface of the sleeve. Furthermore, if the drain holes are formed in triangular shapes, the controllability of the solenoid valve may degrade, as a dead band in which almost no working fluid is discharged from the solenoid valve is created while only the pointed leading end portions of these drain holes communicate with the annular groove.

In the solenoid valve described in JP 2007-92714 A, both the through-holes are open even in a low flow rate range, so that the amount of change in the flow rate relative to the amount of stroke of the spool becomes too large to finely adjust the discharge flow rate of the solenoid valve. Moreover, to provide communication between the groove of the spool and the through-holes of the sleeve, it is necessary to separately provide a guide member that prevents displacement of both members in the circumferential direction, which adds to the number of components.

Therefore, the present disclosure provides a highly controllable solenoid valve of which the discharge flow rate is finely adjustable, and an oil pump to which this solenoid valve is connected.

A solenoid valve according to a first aspect of the present disclosure includes: a cylindrical spool that has an annular groove in an outer surface and moves along an axial direction under a driving force generated by a current being applied to a solenoid part; a cylindrical sleeve that has a through-hole capable of communicating with the annular groove and houses the spool; and an urging member that urges the spool by an urging force acting in a direction opposite from a direction in which the driving force is generated. When no current is applied to the solenoid part, a part of the through-hole communicates with the annular groove. When a current is applied to the solenoid part, the area of communication between the through-hole and the annular groove increases as the spool moves under the driving force acting against the urging force.

If the annular groove is formed in the spool as in this aspect, even when the spool and the sleeve are displaced in the circumferential direction, this annular groove and the through-hole of the sleeve communicate with each other, which eliminates the need for separately providing a guide member. The through-hole of the sleeve and the annular groove formed in the outer surface of the spool can be easily formed by die casting or cutting.

According to the above aspect, a part of the through-hole of the sleeve communicates with the annular groove of the spool when no current is applied to the solenoid part. In the case of a solenoid valve to which a working fluid is supplied through an annular groove of a spool, this means that the working fluid is discharged through the through-hole before a current is applied to the solenoid part. As a result, when a current is applied to the solenoid part, the pressure of the working fluid discharged through the through-hole rises smoothly, so that a rising range of the pressure of the working fluid can be shifted toward the low current side. Thus, a wider range of the current value becomes available for a target pressure of the working fluid (the resolution is enhanced), which makes it possible to finely adjust the discharge flow rate of the solenoid valve and enhance the controllability.

Moreover, this low current range to which the rising range is shifted is a range where a sliding resistance occurring in the solenoid part in proportion to the driving force for moving the spool is small, and a hysteresis relative to the amount of change in the current applied is also small. Therefore, if the above aspect is adopted, the low current range can be effectively used to accurately control the discharge flow rate of the solenoid valve according to the amount of current applied. Furthermore, a part of the through-hole of the sleeve communicates with the annular groove of the spool when a current is yet to be applied to the solenoid part, which eliminates the inconvenience that a dead band is created as only the pointed leading end portion of the through-hole communicates with the annular groove when a current is applied to the solenoid part. Thus, by adopting the above aspect, one can rationally configure a highly controllable solenoid valve of which the discharge flow rate is finely adjustable.

In the above aspect, the through-hole may include a first opening that has a shape of a long hole extending along a circumferential direction of the sleeve, and a second opening that has a shape of a long hole protruding from the first opening along the axial direction; and the part of the through-hole may be a leading end of the second opening that is located on the side farther from the first opening.

In this configuration, the second opening communicating with the annular groove of the spool in the low current range has a shape of a long hole protruding along the axial direction, which allows a gentle change in the discharge flow rate of the solenoid valve. As a result, the discharge flow rate can be finely controlled in the low current range where the hysteresis is small. Even when the area of opening of the first opening is adjusted in a high current range according to a flow rate required at a supply destination of the working fluid, this does not add to the axial length of the solenoid valve as the first opening has a shape of a long hole extending along the circumferential direction of the sleeve.

In the above configuration, the part of the through-hole may further include, separately from the second opening, at least one circular hole that is formed at a portion of the sleeve along the leading end of the second opening in the circumferential direction.

If a circular hole is provided at a portion of the sleeve along the leading end of the second opening in the circumferential direction as in this configuration, the flexibility in setting the flow rate in the low current range can be enhanced. As a result, the low current range where electricity consumption is smaller can be effectively used according to a required discharge flow rate.

In the above configuration, the first opening may have a triangular shape.

If the first opening has a triangular shape as in this configuration, the amount of change in the pressure of the working fluid per unit current value becomes smaller in the high current range as well, so that the solenoid valve can adjust the flow rate with higher resolution (over a wider range of the current value).

In the above configuration, the leading end of the second opening may have a pointed shape.

Also in this configuration, the leading end of the second opening of the sleeve communicates with the annular groove of the spool when no current is applied to the solenoid part, which eliminates the inconvenience that a dead band is created as only the pointed leading end portion of the second opening communicates with the annular groove when a current is applied to the solenoid part.

In the above configuration, the through-hole may further include, separately from the first opening, a third opening that has a shape of a long hole and is formed at a portion of the sleeve along the first opening in the circumferential direction; and an annular groove that provides communication between the first and second openings and the third opening may be provided in the sleeve on the outer side of the through-hole.

If the third opening facing the first opening is further provided as in this configuration, the discharge flow rate can be increased in the high current range. Having a shape of a long hole extending along the circumferential direction of the sleeve, the third opening does not add to the axial length of the solenoid valve. Moreover, as the annular groove that provides communication between the first and second openings and the third opening is provided on the outer side of the through-hole, this annular groove can be easily formed by die casting or cutting In the above configuration, the third opening may have a triangular shape.

If the third opening has a triangular shape as in this configuration, the amount of change in the pressure of the working fluid per unit current value becomes smaller in the high current range as well, so that the solenoid valve can adjust the flow rate with higher resolution (over a wider range of the current value).

An oil pump according to a second aspect of the present disclosure includes: a housing that has a communication passage communicating with the through-hole of the solenoid valve according to claim 1; a rotor disposed inside the housing; an adjustment ring that is disposed on the outer side of the rotor and eccentric to a rotational axis of the rotor; a second urging member that urges the adjustment ring; and a pressure chamber to which a working fluid is supplied through the communication passage in a direction against an urging force of the second urging member to change the amount of eccentricity of the adjustment ring. The housing has a drain hole which has a flow passage area larger than a flow passage area of the part of the through-hole and through which the working fluid is discharged from the pressure chamber.

The discharge rate of the oil pump of this aspect can be varied by supplying a working fluid to the pressure chamber and thereby changing the amount of eccentricity of the adjustment ring. If the working fluid is supplied to the pressure chamber of this oil pump through the above-described solenoid valve, the low current range can be used to finely adjust the discharge rate.

On the other hand, since a part of the through-hole of the sleeve communicates with the annular groove of the spool when no current is applied to the solenoid part, the discharge rate may be unintentionally changed as the pressure inside the pressure chamber rises. However, if a drain hole having a flow passage area larger than the flow passage area of the part of the through-hole is provided in the housing as in this aspect, the working fluid supplied from the solenoid valve to the pressure chamber when no current is applied to the solenoid part can be discharged to the outside. Thus, the pressure inside the pressure chamber does not rise unless a current is applied to the solenoid part and the discharge flow rate of the solenoid valve increases, so that the discharge rate of the oil pump can be controlled with enhanced accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a solenoid valve according to the present disclosure will be described below on the basis of the drawings. However, the present disclosure is not limited to the following embodiment, and various changes can be made within the scope of the gist of the disclosure.

Basic Configuration

Figure 1:
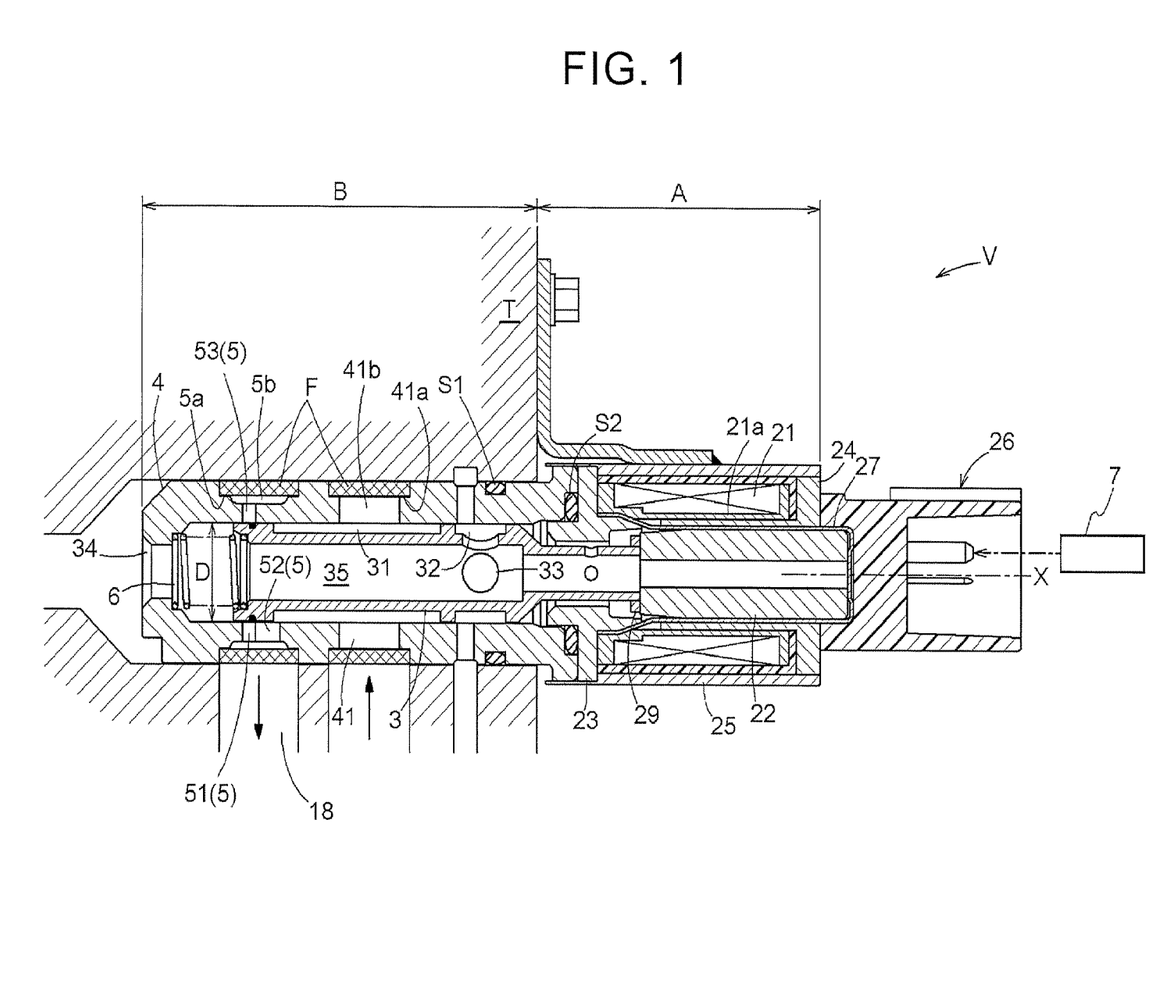
FIG. 1 is a longitudinal sectional view of a solenoid valve according to an embodiment.

As shown in FIG. 1, a solenoid valve V includes a cylindrical solenoid part A that is mounted on a mounting target T (e.g., engine block) so as to be exposed to the outside, and a flow passage switching part B that is mounted by being inserted into the mounting target T.

The solenoid part A includes: a coil 21 that is wound around a bobbin 21a and generates magnetic flux as a current is applied thereto; a columnar plunger 22 that is moved along an axial direction X by the magnetic flux generated; a front yoke 23 through which the magnetic flux generated is passed to attract the plunger 22; a rear yoke 24 that receives and passes the magnetic flux to the plunger 22; and a case 25 housing these components. The solenoid valve V includes a cylindrical connector 26 that is connected to the solenoid part A, and electricity is supplied from the connector 26 to the coil 21 according to the amount of current applied (current value) that is controlled by a control unit 7.

The solenoid part A further includes a guide member 27 that is disposed along an outer surface of the plunger 22. The guide member 27 is made of a non-magnetic substance, and prevents the plunger 22 from being attracted to the rear yoke 24. The plunger 22, the front yoke 23, the rear yoke 24, and the case 25 are made of various magnetic materials through which magnetic flux can be passed.

The magnetic flux generated in the coil 21 as a current is applied thereto flows through the front yoke 23, the case 25, the rear yoke 24, and the plunger 22 in this order, and the plunger 22 moves by being attracted to the front yoke 23. To prevent the plunger 22 from adhering to the front yoke 23, a spacer 29 is disposed on the front side of the plunger 22.

The flow passage switching part B includes a cylindrical spool 3 that butts against the plunger 22 along the axial direction X, and a cylindrical sleeve 4 that houses the spool 3. The spool 3 moves along the axial direction X under a driving force (electromagnetic force) generated as a current is applied to the solenoid part A. Between one end of the spool 3 and the sleeve 4, a spring 6 (an example of the urging member) is provided that urges the spool 3 by an urging force acting in a direction opposite from a direction in which the driving force is generated as a current is applied to the solenoid part A. When a current is applied to the solenoid part A, the other end of the spool 3 is pressed by the plunger 22, while the one end is urged by the spring 6 toward the plunger 22, so that the spool 3 stops at a position where an equilibrium is established between the driving force generated in the solenoid part A and the urging force of the spring 6.

An O-ring S1 that seals between the mounting target T and the sleeve 4 is provided to prevent a fluid leaking out through a clearance between the sleeve 4 and the mounting target T from leaking toward the solenoid part A. Moreover, an O-ring S2 is provided between the sleeve 4 and the front yoke 23 to prevent water from entering the solenoid part A from the outside.

In an outer surface of the spool 3, a first annular groove 31 (an example of the annular groove) and a second annular groove 32 are formed. In addition, a hole 33 is formed so as to penetrate the spool 3, to allow the second annular groove 32 to communicate with a hollow part 35 that forms an internal space of the spool 3. As will be described in detail later, the area of the first annular groove 31 communicating with a discharge opening 5 (an example of the through-hole) of the sleeve 4 can be changed as the spool 3 moves under the driving force acting against the urging force of the spring 6 when a current is applied to the solenoid part A. The second annular groove 32 is formed to discharge a fluid, leaking out through a clearance between the spool 3 and the sleeve 4, from a drain port 34 to the outside through the hole 33. The first annular groove 31 and the second annular groove 32 formed in the outer surface of the spool 3 can be easily formed by die casting or cutting.

Figure 2:
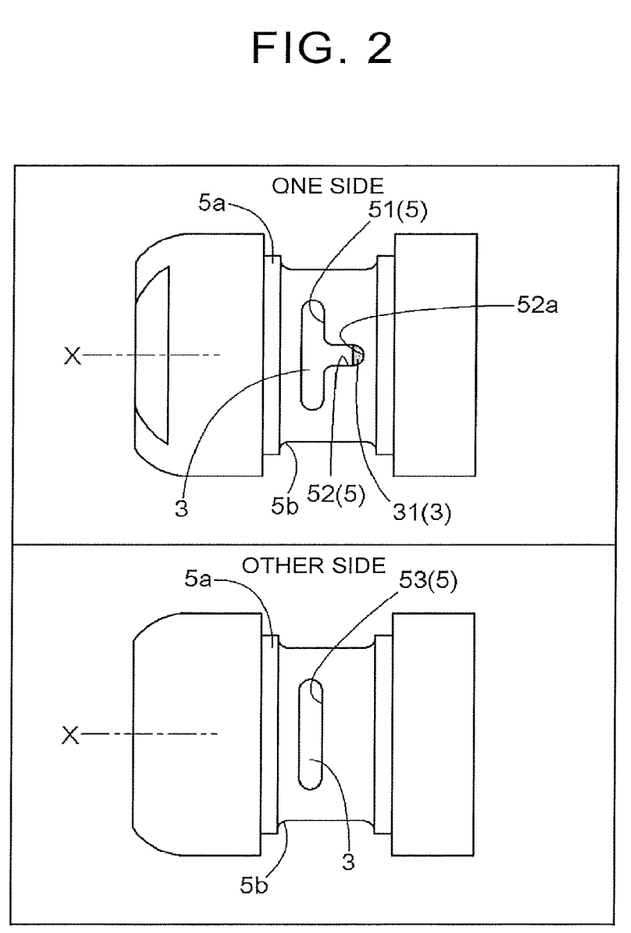
FIG. 2 is an enlarged plan view of a through-hole of a sleeve.

In the sleeve 4, a supply opening 41 through which a fluid is received from a supply source and a discharge opening 5 through which a fluid at a flow rate according to the amount of movement of the spool 3 is discharged to a predetermined fluid supply destination are formed so as to penetrate the sleeve 4 in a radial direction. As shown in FIG. 2, the discharge opening 5 in this embodiment is provided at two positions so as to face each other in the radial direction, and a first annular groove portion 5b (an example of the annular groove) is formed on the outer side of the discharge openings 5 to provide communication between the discharge openings 5 in the circumferential direction. Similarly, the supply opening 41 is provided at two positions so as to face each other in the radial direction, and a second annular groove portion 41b is formed on the outer side of the supply openings 41 to provide communication between the supply openings 41 in the circumferential direction (see FIG. 1).

Steps 41a, 5a are formed respectively in the annular groove portions 41b, 5b of the supply openings 41 and the discharge openings 5. Filter members F are installed on the steps 41a, 5a to remove foreign substances that have entered the fluid. The annular groove portions 41b, 5b formed on the outer circumferential side of the sleeve 4 can be easily formed by die casting or cutting. However, the filter members F may be omitted, and then the steps 41a, 5a may be omitted.

As shown in FIG. 2, in a view along a direction perpendicular to the axial direction X, the discharge opening 5 on one side of the sleeve 4 in this embodiment has a T-shape, and is composed of a first opening 51 that has a shape of an elliptical long hole extending along the circumferential direction, and a second opening 52 that has a shape of an elliptical long hole protruding from the first opening 51 along the axial direction X. The discharge opening 5 on the other side of the sleeve 4 has an I-shape, and is composed of a third opening 53 that has a shape of an elliptical long hole extending along the circumferential direction and is provided so as to face the first opening 51 in the radial direction. Thus, the first opening 51 and the third opening 53 each have a shape of a long hole extending along the circumferential direction, so that the axial length of the solenoid valve V can be reduced.

EXAMPLE

Here, an example will be described in which the solenoid valve V of the above embodiment is disposed in a flow passage for adjusting the discharge pressure of an oil pump 1 (hereinafter referred to simply as a pump 1) that circulates engine oil (hereinafter referred to simply as a working fluid) to an engine E.

Figure 5:
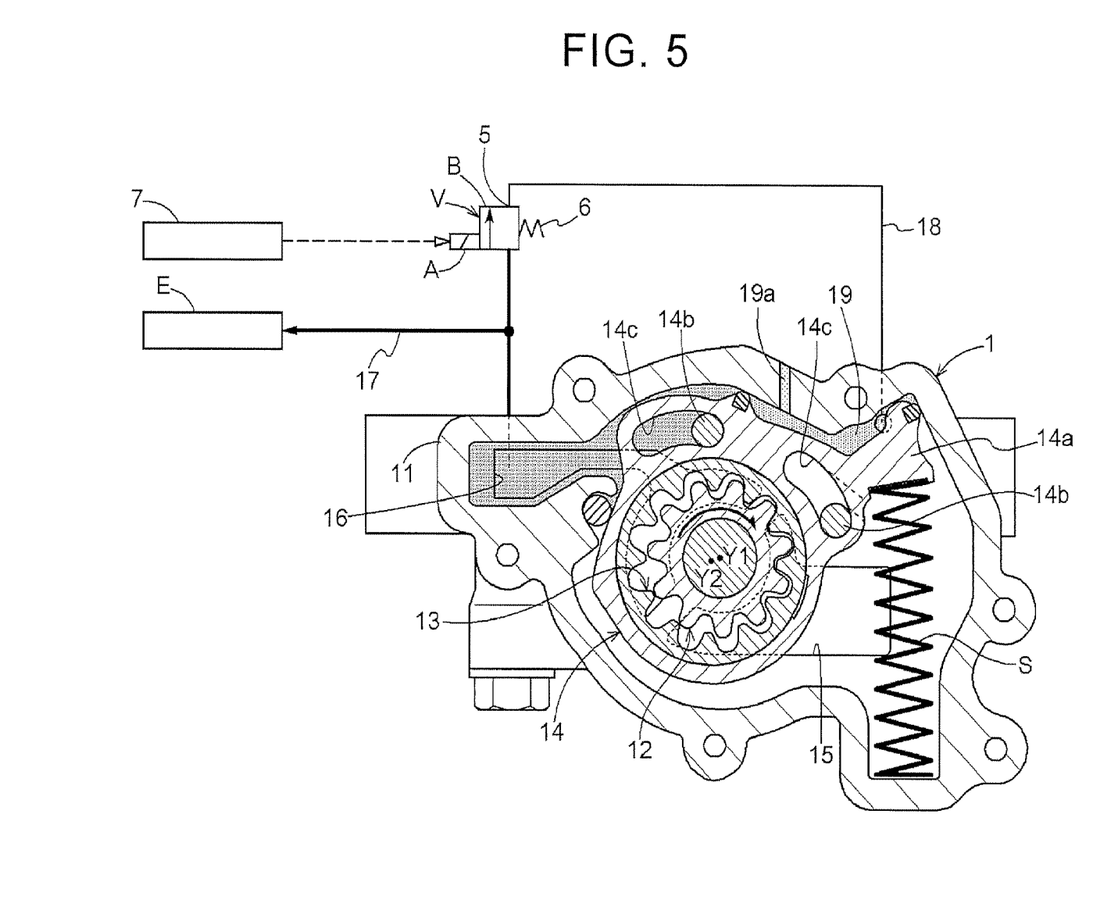
FIG. 5 is a view illustrating a case where the solenoid valve is used for an oil pump.

As shown in FIG. 5, the pump 1 includes a housing 11, an inner rotor 12 (an example of the rotor), an outer rotor 13, an adjustment ring 14 that is eccentric to a first rotational axis Y1 of the inner rotor 12, and a spring S (an example of the second urging member) that urges the adjustment ring 14. The inner rotor 12 rotates around the first rotational axis Y1 as rotary power from a crankshaft of the engine E is transmitted thereto. The outer rotor 13 rotates around a second rotational axis Y2, which is eccentric to the first rotational axis Y1, according to the rotation of the inner rotor 12.

The housing 11 includes a suction port 15 and a discharge port 16, and has a pressure chamber 19 through which a working fluid discharged through the discharge port 16 flows. The working fluid discharged through the discharge port 16 circulates via a feed flow passage 17 to members of the engine E to be supplied with the working fluid, and flows to the pressure chamber 19 through the solenoid valve V that is located in a branch flow passage branched from the feed flow passage 17. In this example, the mounting target T of the solenoid valve V and the housing 11 of the pump 1 are the same, and a communication passage 18 communicating with the discharge openings 5 of the solenoid valve V is formed in the housing 11. The working fluid is supplied to the pressure chamber 19 through the communication passage 18 in a direction against an urging force of the spring S.

When no current is applied to the solenoid part A of the solenoid valve V, a leading end 52a of the second opening 52 (a part of the discharge opening 5) of the sleeve 4 communicates with the first annular groove 31 of the spool 3, so that a small amount of working fluid is supplied to the pressure chamber 19 (see FIG. 1 and FIG. 2). When a current is applied to the solenoid part A, the area of communication between the second opening 52 and the first annular groove 31 increases as the spool 3 moves, and finally a state is reached where the first and third openings 51, 53 and the first annular groove 31 communicate with each other, so that the working fluid is supplied to the pressure chamber 19 at high flow rate (see FIG. 3 and FIG. 4). A drain hole 19a which has a flow passage area larger than a flow passage area with which the leading end 52a of the second opening 52 communicates with the first annular groove 31 when no current is applied to the solenoid part A, and through which the working fluid is discharged from the pressure chamber 19, is formed in the housing 11 so as to penetrate the housing 11. The drain hole 19a prevents a pressure rise inside the pressure chamber 19 by discharging, to the outside, the working fluid flowing into the pressure chamber 19 when no current is applied to the solenoid part A. Moreover, the drain hole 19a secures the rotation performance of the pump 1 by discharging the working fluid leaking out through a clearance between the inner rotor 12, the outer rotor 13, and the adjustment ring 14 and the housing 11.

The adjustment ring 14 is disposed on the outer side of the inner rotor 12, and supports the outer rotor 13 from the radially outer side so as to be rotatable relative to the inner rotor 12. The adjustment ring 14 is formed in a ring shape around the same axis as the second rotational axis Y2, and an operation portion 14a protruding in a radially outward direction is connected to the adjustment ring 14. When a current is applied to the solenoid valve V and the pressure of the working fluid flowing through the pressure chamber 19 is applied to the operation portion 14a of the adjustment ring 14, the operation portion 14a moves inside the housing 11, causing the adjustment ring 14 to revolve. As a result, a guide pin 14b and a guide groove 14c slide together over a predetermined range, and the first rotational axis Y1 and the second rotational axis Y2 come closer to each other, so that the discharge pressure of the pump 1 decreases. Thus, the pump 1 of this example is configured so that, as the adjustment ring 14 revolves, the amount of eccentricity of the adjustment ring 14 and the outer rotor 13 relative to the inner rotor 12 is adjusted and thereby the discharge pressure of the pump 1 is adjusted.

Mode of Operation of Solenoid Valve

Next, a mode of operation of the solenoid valve V used for adjusting the discharge pressure of the pump 1 will be described.

FIG. 1 shows the position of the spool 3 when a current applied to the solenoid part A is off. When a current applied to the solenoid part A is turned off, the spool 3 and the plunger 22 move to a right end under the urging force of the spring 6. At this point, as shown in FIG. 2, the leading end 52a of the second opening 52 of the sleeve 4 communicates with the first annular groove 31 of the spool 3, so that a small amount of working fluid discharged through the discharge port 16 is supplied to the pressure chamber 19, and the working fluid supplied to the pressure chamber 19 is discharged through the drain hole 19a of the housing 11. Thus, the working fluid is discharged from the pressure chamber 19 to the outside, and the operation portion 14a moves upward under the urging force of the spring S, so that the amount of eccentricity of the outer rotor 13 relative to the inner rotor 12 becomes maximum (see FIG. 5). As a result, the pressure of the working fluid discharged from the pump 1 shifts to a maximum pressure setting.

Figure 3:
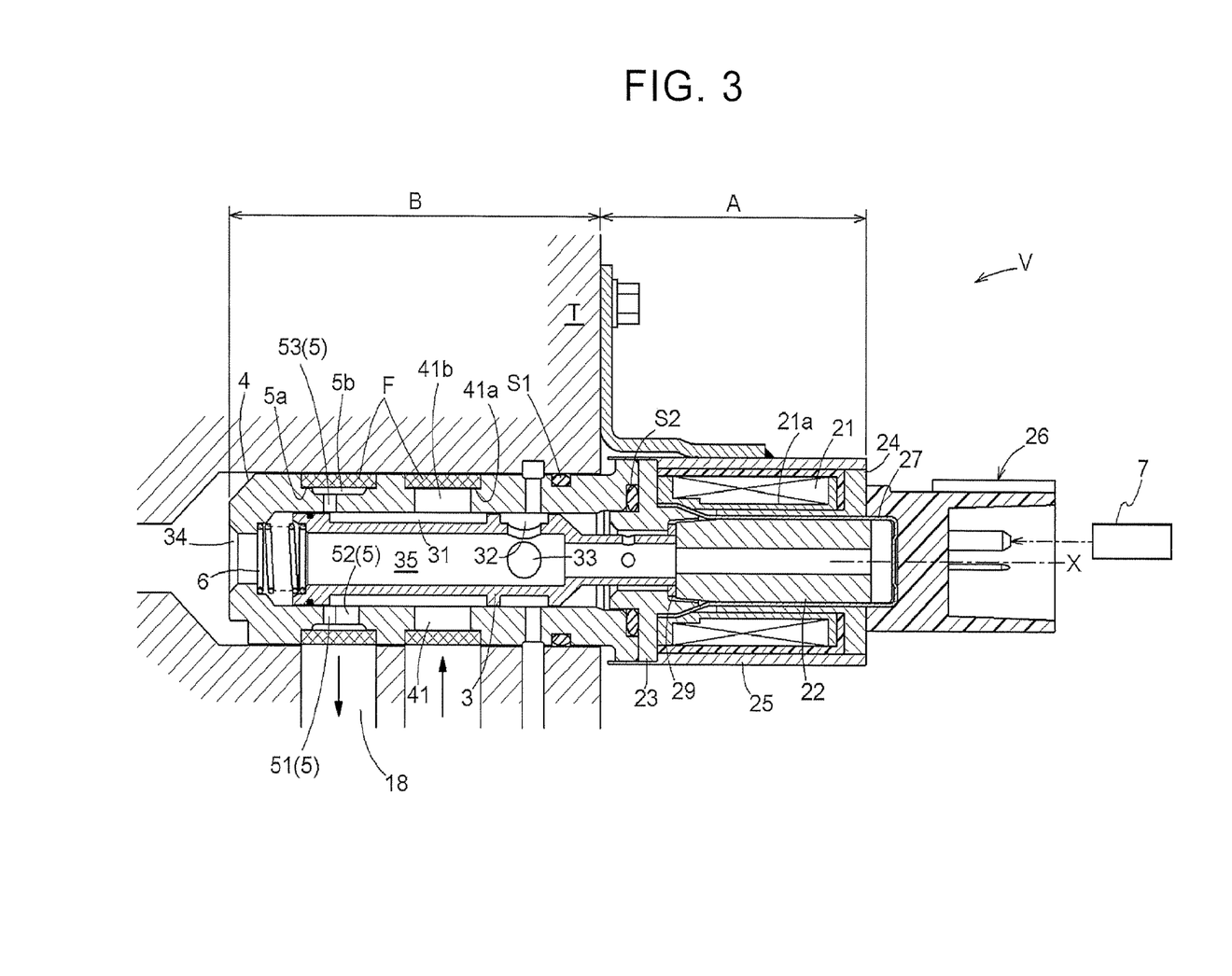
FIG. 3 is a longitudinal sectional view of a state where the amount of current applied to the solenoid valve is maximized.
Figure 4:
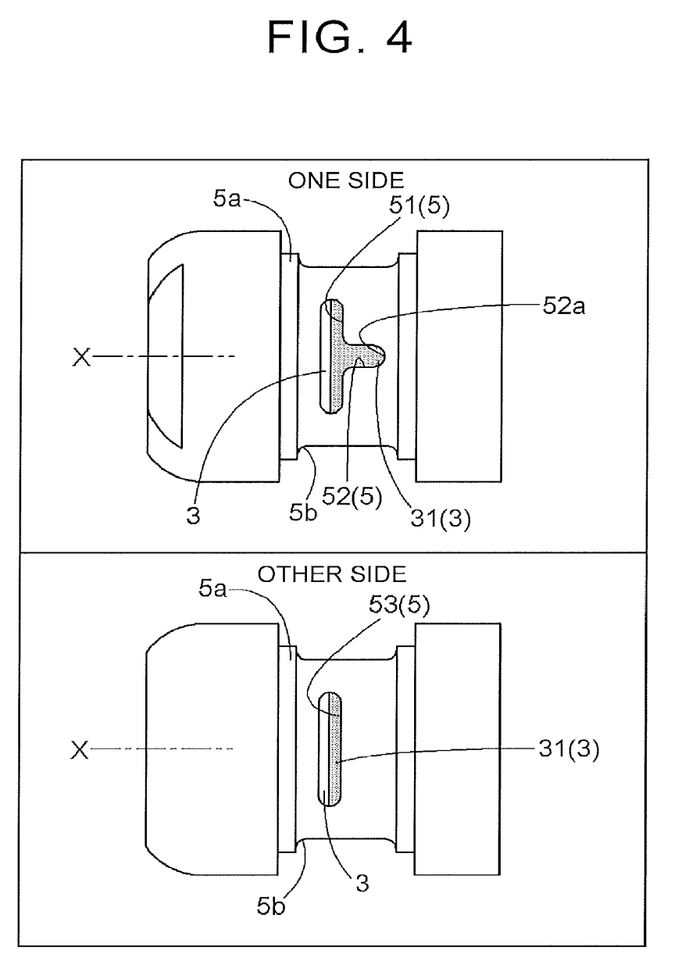
FIG. 4 is an enlarged plan view of the through-hole in a state where the amount of current applied to the solenoid valve is maximized.

When a current is applied to the solenoid part A, the plunger 22 is driven toward the front yoke 23 along the axial direction X, causing the spool 3 to move in a leftward direction against the urging force of the spring 6. Then, the spool 3 stops at a position where an equilibrium is established between the urging force of the spring 6 and the driving force of the plunger 22, and, for example, the state of FIG. 3 showing the position of a maximum movement of the spool 3 is reached. At this point, as shown in FIG. 4, the first and second openings 51, 52 and the third opening 53 of the sleeve 4 communicate with the first annular groove 31 of the spool 3, and the working fluid that has merged in the first annular groove portion 5b of the sleeve 4 and been discharged through the discharge port 16 is supplied to the pressure chamber 19 at high flow rate. As a result, the pressure of the working fluid builds up in the pressure chamber 19, and the operation portion 14a moves downward against the urging force of the spring S, so that the amount of eccentricity of the outer rotor 13 relative to the inner rotor 12 becomes minimum (see FIG. 5). As a result, the pressure of the working fluid discharged from the pump 1 shifts to a minimum pressure setting.

Figure 6:
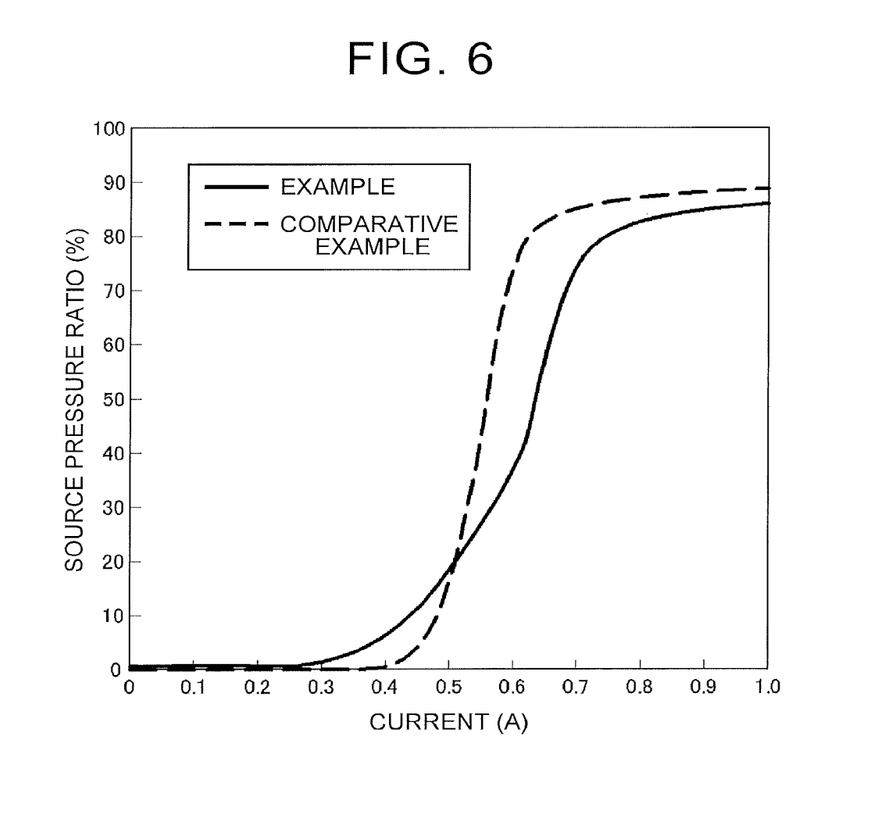
FIG. 6 is a comparative graph showing a relation between the amount of current applied to the solenoid valve and a discharge pressure ratio.

FIG. 6 shows a relation between the amount of current applied to the solenoid valve V and a ratio of the pressure of the working fluid discharged through the discharge opening 5 of the solenoid valve V to the pressure of the working fluid supplied to the supply opening 41 of the solenoid valve V (source pressure ratio). FIG. 6 compares a comparative example in which the discharge opening of the sleeve has a rectangular shape as a whole and is provided at two positions in the circumferential direction, and the example in which the discharge opening 5 of the above embodiment is provided at two positions in the circumferential direction. In the comparative example, the discharge openings of the sleeve do not communicate with the first annular groove of the spool when a current applied to the solenoid part A is off.

As described above, the amount of current applied to the solenoid valve V is controlled in response to a signal from the control unit 7, and according to this amount of current applied, the position of the spool 3 changes voluntarily from the state of FIG. 1 to the state of FIG. 3. Meanwhile, the leading end 52a of the second opening 52 of the sleeve 4 communicates with the first annular groove 31 of the spool 3 when no current is applied, so that the solenoid valve V of the example can build up the pressure of the working fluid inside the pressure chamber 19 in a lower current range than in the comparative example. As a result, the solenoid valve V can adjust the flow rate with higher resolution (over a wider range of the current value), and can finely change the discharge pressure of the pump 1. This low current range is a range where the driving force for moving the spool 3 is small, and therefore the sliding resistance acting on the plunger 22 of the solenoid part A is small and the hysteresis is also small. Thus, it is possible to use this low current range where the hysteresis is small to accurately control the amount of reciprocating movement of the spool 3 according to the amount of current applied.

Since the second opening 52 is formed in a shape of a long hole extending along the axial direction X, the pressure of the working fluid supplied to the pressure chamber 19 of the pump 1 changes at a gentle gradient according to the position of movement of the spool 3. In other words, the amount of change in the pressure of the working fluid per unit current value is smaller than in the comparative example. As a result, the solenoid valve V can adjust the flow rate with even higher resolution (over an even wider range of the current value).

If the resolution of the solenoid valve V is thus enhanced by allowing a gentle change in the flow rate while shifting the rising range of the pressure of the working fluid toward the low current side, the discharge pressure of the pump 1 can be adjusted accurately according to the speed of the engine E. As a result, the amount of unnecessary work done by the pump 1 is reduced, so that the fuel efficiency is improved.

Alternative embodiments will be described below. As the basic configuration is the same as that of the above embodiment, only differences in configuration will be described using the drawings. To facilitate the understanding of the drawings, the same names and reference signs of the members as in the above embodiment will be used in the description.

Alternative Embodiment 1

Figure 7:
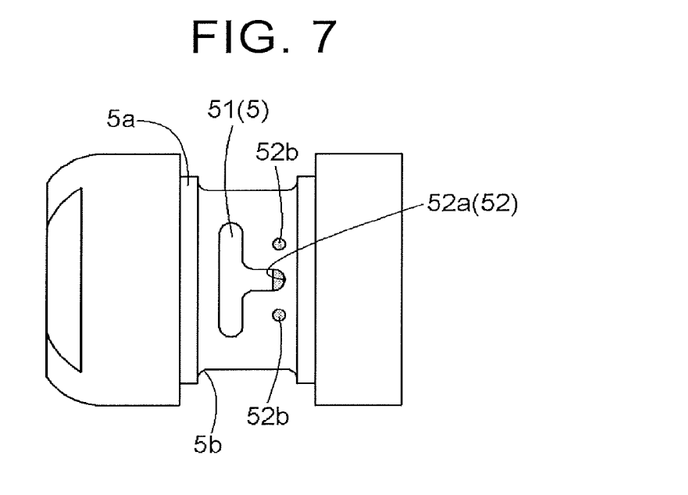
FIG. 7 is a plan view showing the shape of an opening of a through-hole according to Alternative Embodiment 1.

As shown in FIG. 7, the part of the discharge opening 5 that communicates with the first annular groove 31 of the spool 3 when no current is applied to the solenoid part A may further include, separately from the second opening 52 of the sleeve 4, at least one circular hole 52b that is formed at a portion of the sleeve 4 along the leading end 52a of the second opening 52 in the circumferential direction. In this embodiment, two circular holes 52b disposed one on each side of the leading end 52a of the second opening 52 are provided.

If the circular holes 52b adjacent to the leading end 52a of the second opening 52 in the circumferential direction are thus provided, the flexibility in setting the flow rate in the low current range can be enhanced. As a result, the low current range where electricity consumption is smaller can be effectively used according to a required discharge flow rate.

Alternative Embodiment 2

Figure 8:
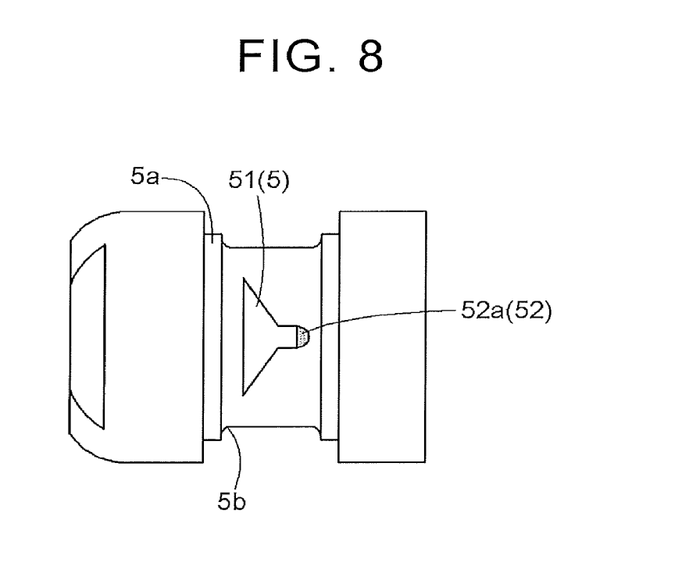
FIG. 8 is a plan view showing the shape of an opening of a through-hole according to Alternative Embodiment 2.

As shown in FIG. 8, the first opening 51 or the third opening 53 that communicates with the first annular groove 31 of the spool 3 as the spool 3 moves may be formed in a triangular shape. In this case, the amount of change in the pressure of the working fluid per unit current value becomes smaller in the high current range as well, so that the solenoid valve V can adjust the flow rate with even higher resolution (over an even wider range of the current value).

Alternative Embodiment 3

Figure 9:
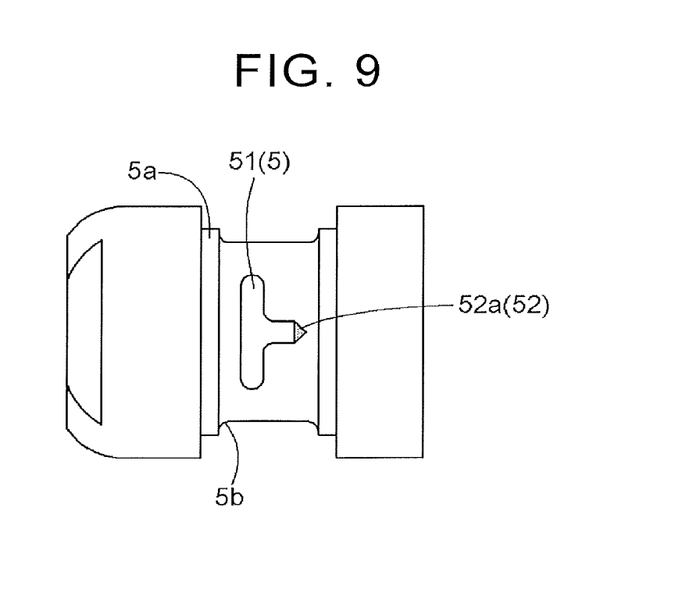
FIG. 9 is a plan view showing the shape of an opening of a through-hole according to Alternative Embodiment 3.

As shown in FIG. 9, the leading end 52a of the second opening 52 may have a pointed shape. Also in this embodiment, the leading end 52a of the second opening 52 of the sleeve 4 communicates with the first annular groove 31 of the spool 3 when no current is applied to the solenoid part A, which eliminates the inconvenience that a dead band is created as only the pointed leading end portion of the second opening 52 communicates with the first annular groove 31 when a current is applied to the solenoid part A.

Other Embodiments

The shapes of the discharge openings 5 in the above embodiments are merely examples, and various changes can be made within the scope of the gist of the disclosure; for example, the first opening 51, the second opening 52, and the third opening 53 may have a rectangular shape or a spiral shape instead of the long hole shape. The third opening 53 is provided so as to face the first opening 51 in the radial direction in the above embodiment, but the third opening 53 may be provided at any position along the first opening 51 in the circumferential direction of the sleeve 4. For example, the center of the third opening 53 may be set at a position offset by 120 degrees from the center of the first opening 51 in the circumferential direction. The discharge opening 5 is provided at two positions along the circumferential direction in the above embodiment, but the third opening 53 may be omitted and the discharge opening 5 may be formed at one position by the first opening 51 or the second opening 52. Alternatively, the first opening 51 and the second opening 52, or the third opening 53, may be provided at two or more positions. The pump 1 is a trochoid pump in the above embodiment, but the pump 1 may instead be a vane pump. In the case of a vane pump, the pump 1 includes an inner rotor having vanes that move in and out, and an adjustment ring that is disposed on the outer side of the inner rotor and eccentric to a rotational axis of the inner rotor. Thus, the outer rotor is omitted, but the basic configuration is the same as that of the pump 1 in the above embodiment. In the above embodiment, the example has been shown in which the solenoid valve V is used to adjust the discharge rate of the pump 1. However, various forms of usage of the solenoid valve V are conceivable, including an application to an oil control valve (OCV) of a valve timing control device.

The present disclosure is applicable to solenoid valves used for various devices and to oil pumps used for vehicles etc.

What is claimed is:

1. A solenoid valve comprising:
a cylindrical spool that has an annular groove in an outer surface and moves along an axial direction under a driving force generated by a current being applied to a coil;
a cylindrical sleeve that has a through-hole configured to communicate with the annular groove and houses the spool; and
an urging member that urges the spool by an urging force acting in a direction opposite from a direction in which the driving force is generated, wherein:
when no current is applied to the coil, a part of the through-hole communicates with the annular groove; and
when a current is applied to the coil, an area of communication between the through-hole and the annular groove changes only in an increasing direction from the area of communication when no current is applied to the coil as the spool moves under the driving force acting against the urging force.

2. The solenoid valve according to claim 1, wherein:
the through-hole includes a first opening that has a shape of a long hole extending along a circumferential direction of the sleeve, and a second opening that has a shape of a long hole protruding from the first opening along the axial direction; and
the part of the through-hole is a leading end of the second opening that is located on a side farther from the first opening.

3. The solenoid valve according to claim 2, wherein the part of the through-hole further includes, separately from the second opening, at least one circular hole that is formed at a portion of the sleeve along the leading end of the second opening in the circumferential direction.

4. The solenoid valve according to claim 2, wherein the first opening has a triangular shape.

5. The solenoid valve according to claim 2, wherein the leading end of the second opening has a pointed shape.

6. The solenoid valve according to claim 2, wherein:
the through-hole further includes, separately from the first opening, a third opening that has a shape of a long hole and is formed at a portion of the sleeve along the first opening in the circumferential direction; and
an annular groove portion that provides communication between the first and second openings and the third opening is provided in the sleeve on an outer side of the through-hole.

7. The solenoid valve according to claim 6, wherein the third opening has a triangular shape.

8. An oil pump comprising:
a housing that has a communication passage communicating with the through-hole of the solenoid valve according to claim 1;
a rotor disposed inside the housing;
an adjustment ring that is disposed on an outer side of the rotor and eccentric to a rotational axis of the rotor;
a second urging member that urges the adjustment ring; and
a pressure chamber to which a working fluid is supplied through the communication passage in a direction against an urging force of the second urging member to change an amount of eccentricity of the adjustment ring, wherein
the housing has a drain hole which has a flow passage area larger than a flow passage area of the part of the through-hole and through which the working fluid is discharged from the pressure chamber.

9. A solenoid valve comprising:
a cylindrical spool that has an annular groove in an outer surface and moves along an axial direction under a driving force generated by a current being applied to a coil;
a cylindrical sleeve that has a through-hole configured to communicate with the annular groove and houses the spool; and
an urging member that urges the spool by an urging force acting in a direction opposite from a direction in which the driving force is generated, wherein:
when no current is applied to the coil, a part of the through-hole communicates with the annular groove,
when a current is applied to the coil, an area of communication between the through-hole and the annular groove increases as the spool moves under the driving force acting against the urging force,
the through-hole includes a first opening that has a shape of a long hole extending along a circumferential direction of the sleeve, and a second opening that has a shape of a long hole protruding from the first opening along the axial direction,
the part of the through-hole is a leading end of the second opening that is located on a side farther from the first opening, and
the part of the through-hole further includes, separately from the second opening, at least one circular hole that is formed at a portion of the sleeve along the leading end of the second opening in the circumferential direction.

10. A solenoid valve comprising:
a cylindrical spool that has an annular groove in an outer surface and moves along an axial direction under a driving force generated by a current being applied to a coil;
a cylindrical sleeve that has a through-hole configured to communicate with the annular groove and houses the spool; and
an urging member that urges the spool by an urging force acting in a direction opposite from a direction in which the driving force is generated, wherein:
when no current is applied to the coil, a part of the through-hole communicates with the annular groove,
when a current is applied to the coil, an area of communication between the through-hole and the annular groove increases as the spool moves under the driving force acting against the urging force,
the through-hole includes a first opening that has a shape of a long hole extending along a circumferential direction of the sleeve, and a second opening that has a shape of a long hole protruding from the first opening along the axial direction,
the part of the through-hole is a leading end of the second opening that is located on a side farther from the first opening,
the through-hole further includes, separately from the first opening, a third opening that has a shape of a long hole and is formed at a portion of the sleeve along the first opening in the circumferential direction, and
an annular groove portion that provides communication between the first and second openings and the third opening is provided in the sleeve on an outer side of the through-hole.

* * * * *